(12) United States Patent
Ito

(10) Patent No.: US 8,142,955 B2
(45) Date of Patent: *Mar. 27, 2012

(54) FUEL CELL SYSTEM, FUEL CELL VEHICLE, AND OPERATING METHOD FOR FUEL CELL SYSTEM

(75) Inventor: Masashi Ito, Yokosuka (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 884 days.

This patent is subject to a terminal disclaimer.

(21) Appl. No.: 12/084,637

(22) PCT Filed: Nov. 22, 2006

(86) PCT No.: PCT/JP2006/323871
§ 371 (c)(1),
(2), (4) Date: May 7, 2008

(87) PCT Pub. No.: WO2007/069460
PCT Pub. Date: Jun. 21, 2007

(65) Prior Publication Data
US 2009/0253001 A1   Oct. 8, 2009

(30) Foreign Application Priority Data
Dec. 15, 2005   (JP) ................. 2005-362178

(51) Int. Cl.
*H01M 8/22* (2006.01)
(52) U.S. Cl. .......... 429/502; 429/504; 429/505
(58) Field of Classification Search ......... 429/502, 429/504, 505, 506
See application file for complete search history.

(56) References Cited

U.S. PATENT DOCUMENTS

| | | | |
|---|---|---|---|
| 3,420,713 A * | 1/1969 | Childs ................. | 429/504 X |
| 5,728,747 A | 3/1998 | Kazmaier et al. | |
| 6,713,206 B2 * | 3/2004 | Markoski et al. ........ | 429/506 X |
| 7,141,322 B2 * | 11/2006 | Qi et al. ................ | 429/506 X |
| 7,799,485 B2 * | 9/2010 | Ito et al. ................ | 429/531 |
| 2003/0008196 A1 | 1/2003 | Wessel et al. | |
| 2007/0287049 A1 | 12/2007 | Cornet | |
| 2008/0044709 A1 | 2/2008 | Ito | |

FOREIGN PATENT DOCUMENTS

| | | |
|---|---|---|
| EP | 1 271 682 A2 | 1/2003 |
| JP | 10-077307 | 3/1998 |
| JP | 2000-223135 A | 8/2000 |
| JP | 2001-135338 | 5/2001 |

(Continued)

OTHER PUBLICATIONS

Researches and Developments of Proton-Exchange Membrane Fuel Cell, "Researches on Deterioration Factors of Proton-Exchange Membrane Fuel Cell Fund Research (1) on Deterioration Factors, Deterioration Factor of Electrode Catalyst/Electrolyte Interfaces," Kyoto University Graduate School of Engineering, Mar. 2002, pp. 13, 24, 25, 27 and 28 with English translation.

(Continued)

*Primary Examiner* — Stephen J. Kalafut
(74) *Attorney, Agent, or Firm* — Foley & Lardner LLP

(57) ABSTRACT

A utility supply system supplies a fluid containing an antioxidant of a gaseous phase to a stack of proton-exchange membrane fuel cells, for efficient removal of hydroxyl radicals.

17 Claims, 9 Drawing Sheets

FOREIGN PATENT DOCUMENTS

| | | |
|---|---|---|
| JP | 2001-205095 | 7/2001 |
| JP | 2002-071597 | 3/2002 |
| JP | 2003-109623 A | 4/2003 |
| JP | 2004-134269 A | 4/2004 |
| JP | 2005-190752 A | 7/2005 |
| JP | 2006-236935 A | 9/2006 |
| WO | WO 2006/006502 A1 | 1/2006 |
| WO | WO 2006/037929 A1 | 4/2006 |

OTHER PUBLICATIONS

Researches and Developments of a Durability-Elevated Hydrocarbon System Electrolyte Membrane for Proton-Exchange Membrane Fuel Cells in the Proton-Exchange Membrane Fuel Cell Elements Technology Development and Like Program in the Proton-Exchange Membrane Fuel Cell System Technology Project, Report, Mar. 2003, p. 31, with English translation.

J. Pospisil, "Current Status of Exploitation of Radical Scavenging Stabilizers in Advanced Polymer Stabilization," Angewandte Makromolekulare Chemie. Applied Macromolecular Chemistry and physics, vol. 216, Mar. 1, 1994, pp. 135-146.

Notification of Reasons for Refusal in JP Appln No: 2005-362178 dated Sep. 20, 2011.

* cited by examiner

FUEL CELL SYSTEM, FUEL CELL VEHICLE, AND OPERATING METHOD FOR FUEL CELL SYSTEM

TECHNICAL FIELD

The present invention relates to a fuel cell system, a fuel cell vehicle, and an operating method for a fuel cell system, and in particular, to a fuel cell system, as well as a fuel cell vehicle, including a proton-exchange membrane fuel cell (referred herein sometimes to "PEFC"), and an operating method for a fuel cell system including a PEFC.

BACKGROUND ART

The fuel cell technology is attracting attention as a solution to the problem of energy resources, as well as to the issue of global warming due to CO2 emission.

The fuel cell is adapted for electrochemical oxidation of a fuel, such as hydrogen or methanol or any hydrocarbon else in the cell, to effect a direct conversion of chemical energy of the fuel to electrical energy to be taken out.

The fuel cell is thus free from emissions of combustion products of fuel, such as NOX and SOX, and attracts attention as a clean energy source for internal combustion engines such as for automobiles, or for thermal power plants.

There are some types of fuel cells, with the PEFC (proton-exchange membrane fuel cell) inclusive, which is now most watched, and developed.

The PEFC has various advantages, such that it is (1) adapted for an operation to be facile in start and stop at low temperatures, (2) allowed to be high in theoretical voltage as well as in theoretical efficiency of conversion, (3) implemented with a liquid-free electrolyte allowing a flexible design of cell structure, such as a vertical type, and (4) configured for an interface between ion exchange membrane and electrode to have a secured three-phase interface as a reaction field to take out an enhanced amount of current, achieving a high density power output.

The most-watched PEFC yet has many unsolved problems. In particular, techniques of polyelectrolyte membrane constitute a top challenge.

An electrolyte membrane that has a now widest application is made of a perfluorosulfonic acid polymer, which is typified by the Nafion® film commercially available from Du Pont Co., U.S.A., and has a history, where it has been developed as a membrane having a tolerance to active oxygen that the fuel cell generates at the air electrode (anode as positive-pole). Long endurance tests have not yet revealed a sufficient tolerance.

The principle of operation of a fuel cell includes two electrochemical processes, being an $H_2$ oxidation at the fuel electrode (cathode as negative-pole), and a four-electron reduction of molecular oxygen ($O_2$) shown by formula (A1) below, which produces water.

$$O_2 + 4H^+ + 4e^- \rightarrow 2H_2O \quad (A1)$$

Actually, concurrent side reactions occur. Typically, a two-electron reduction of $O_2$ takes place at the air electrode, producing hydrogen peroxide ($H_2O_2$), as shown by formula (A2) below.

$$O_2 + 2H^+ + 2e^- \rightarrow H_2O_2 \quad (A2)$$

Hydrogen peroxide is stable, and has a long life, though weak in oxidizability.

Hydrogen peroxide decomposes, following reaction formulas (A3) and (A4) shown below. When decomposing, it generates radicals, such as hydroxy radical (.OH) and hydroperoxy radical (.OOH). Such radicals, in particular hydroxy radical, are strong in oxidizability, so that even perfluorosulfonated polymer used as an electrolyte membrane may be decomposed in a long use.

$$H_2O_2 \rightarrow 2.OH \quad (A3)$$

$$H_2O_2 \rightarrow .H + .OOH \quad (A4)$$

Low-valence ions of transition metal such as $Fe^{2+}$, $Ti^{3+}$, or $Cu^+$, if present in the fuel cell, cause a Haber-Weiss reaction, where hydrogen peroxide is one-electron reduced by such a metal ion, generating hydroxy radical.

Hydroxy radical, most reactive among free radicals, has a very strong oxidizability, as is known. If the metal ion is an iron ion, the Haber-Weiss reaction is known as a Fenton reaction shown by formula (A5) below.

$$Fe^{2+} + H_2O_2 \rightarrow Fe^{3+} + OH^- + .OH \quad (A5)$$

Such being the case, metal ions, if mixed in an electrolyte membrane, cause a Haber-Weiss reaction, whereby hydrogen peroxide in the electrolyte membrane is changed into hydroxy radical, whereby the electrolyte membrane may be deteriorated (Kyoto University Graduate School of Engineering as entrustee from the New Energy and Industrial Technology Development Organization, "2001 yearly results report researches and developments of proton-exchange membrane fuel cell, researches on deterioration factors of proton-exchange membrane fuel cell, fund research (1) on deterioration factors, deterioration factor of electrode catalyst/electrolyte interfaces", March 2002, p. 13, 24, 27).

With that, to prevent an electrolyte membrane from being oxidized by hydroxy radical, there has been a method proposed in Japanese Patent Application Laying-Open Publication No. 2000-223135, for example, in which a compound with phenolic hydroxyl is mixed in the electrolyte membrane, so that peroxide radicals are trapped to be inactive.

Another method is proposed in Japanese Patent Application Laying-Open Publication No. 2004-134269, in which an electrolyte membrane has a phenol compound, amine compound, sulfur compound, phosphorus compound, or the like mixed therein as anantioxidant to vanish generated radicals.

Another method proposed in Japanese Patent Application Laying-Open Publication No. 2003-109623 has an electrolyte membrane disposed adjacent to a catalyst layer containing molecules having a smaller bond energy than carbon-fluorine bonding, the molecules reacting with priority to hydroxy radicals, thereby protecting the electrolyte membrane.

DISCLOSURE OF INVENTION

Generation of hydroxy radical occurs with a highest tendency in a vicinity of a three-phased interface of an air electrode, that is an environment where oxygen and platinum as an electrode catalyst exist, and compounds tend to be oxidized, so that those methods in which an electrolyte membrane simply contains an oxidation-preventive compound, as described above, may have this compound also oxidized to disappear, whether hydroxy radical is present or not, thus resulting in an inefficient prevention of oxidation of the electrolyte membrane.

Still less, that compound may react with hydroxy radical to generate an unstable radical or peroxide, which may act as an initiator of additional reaction for oxidation, causing deterioration of the electrolyte membrane.

This invention is made in view of such points.

It therefore is an object of the invention to provide a fuel cell system, a fuel cell vehicle, and an operating method for a fuel cell system, adapted for an efficient prevention of electrolyte membrane oxidation to achieve an excellent tolerance.

According to the invention, a fuel cell system comprises a proton-exchange membrane fuel cell, and a fluid supply configured to supply the fuel cell with a fluid containing an antioxidant of a gaseous phase.

According to the invention, a fuel cell vehicle comprises a fuel cell system according to the invention.

According to the invention, an operating method for a fuel cell system including a proton-exchange membrane fuel cell comprises supplying the fuel cell with a fluid containing an antioxidant of a gaseous phase.

BRIEF DESCRIPTION OF DRAWINGS

The above and further objects and novel features of the present invention will more fully appear from the following detailed description when the same is read in conjunction with the accompanying drawings, in which.

BEST MODE FOR CARRYING OUT THE INVENTION

Figure 1:
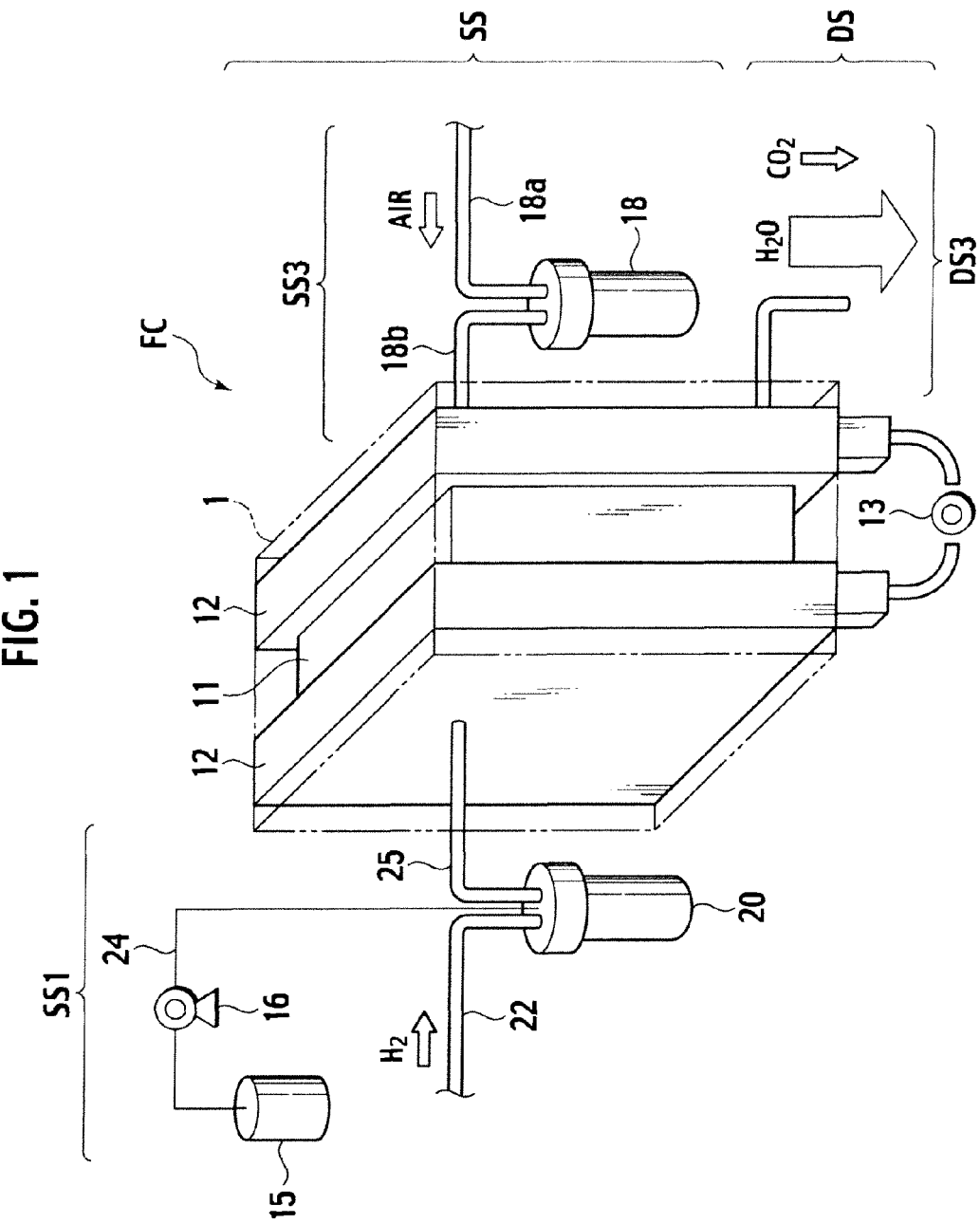
FIG. 1 is a pictorial fluid circuit diagram of a fuel cell system according to an embodiment of the invention.

There will be described into details a fuel cell system, a fuel cell vehicle, and an operating method for a fuel cell system according to a preferred embodiment of the present invention, as a best mode for carrying out the invention, with reference made to the accompanying drawings. In the drawings, like members or elements are designated by like reference characters.

Description is first made of a fuel cell system FC according to an embodiment of the invention, with reference to FIG. 1 to FIG. 6.

Figure 2:
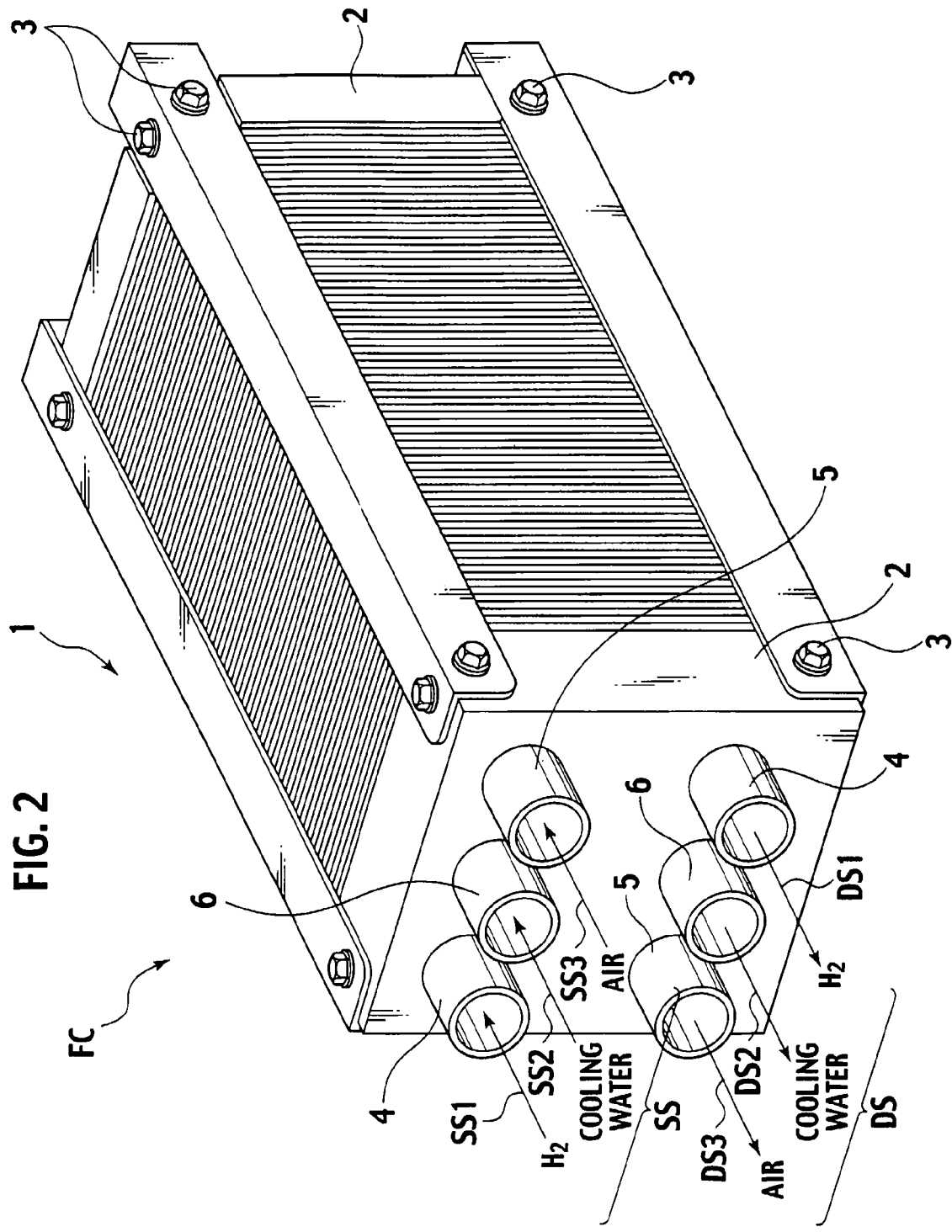
FIG. 2 is a perspective view of a fuel cell stack of the fuel cell system of FIG. 1.
Figure 3:
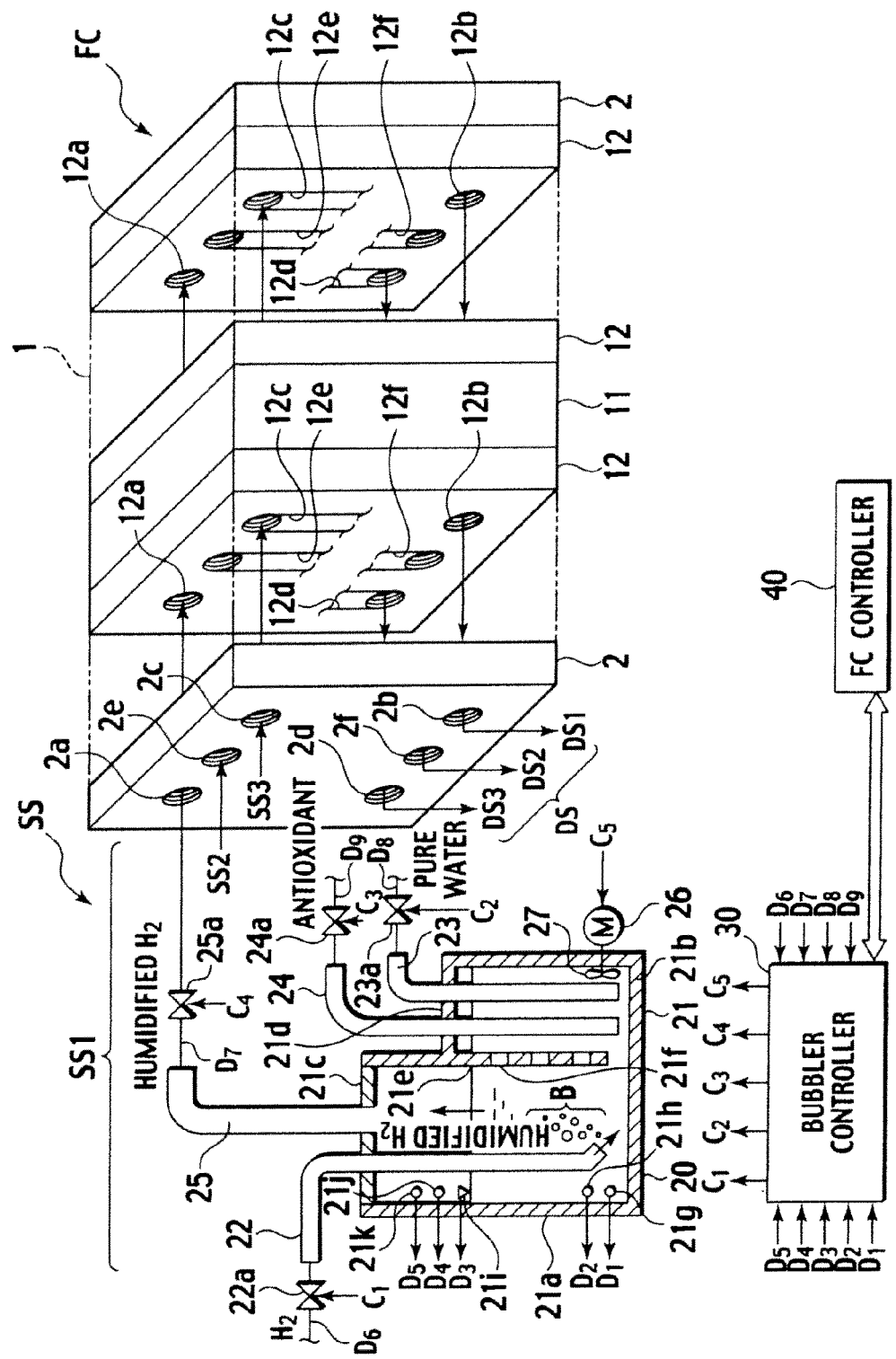
FIG. 3 is a pictorial circuit diagram of a fuel supply system for the fuel cell stack of FIG. 2.
Figure 4:
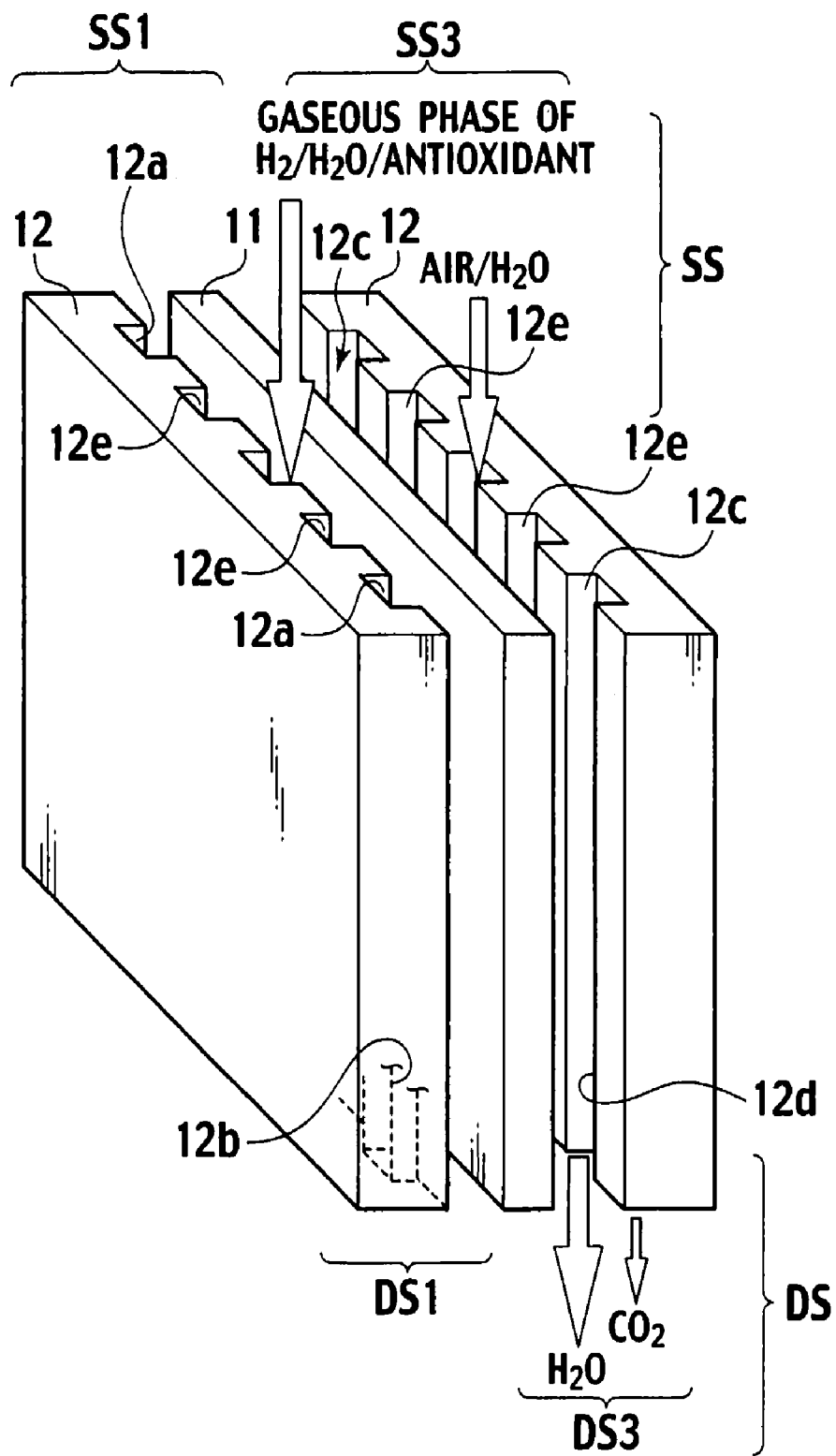
FIG. 4 is an exploded view of an essential portion of the fuel cell stack of FIG. 2.
Figure 5:
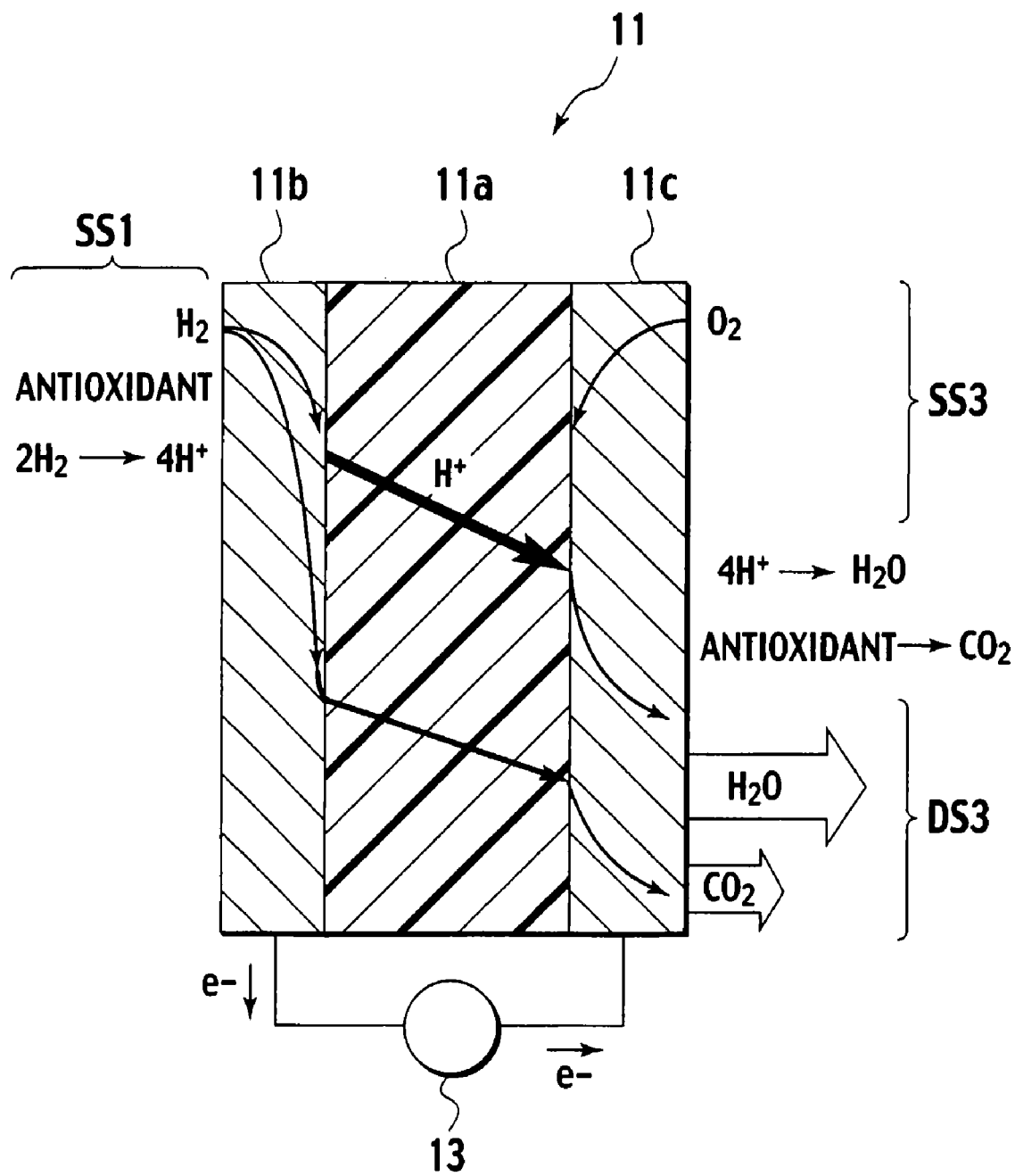
FIG. 5 is a sectional view of a unit cell of the fuel cell stack of FIG. 2.

FIG. 1 is a pictorial fluid circuit diagram of the fuel cell system FC; FIG. 2, a perspective view of a fuel cell stack 1 of the fuel cell system FC; FIG. 3, a pictorial circuit diagram of a fuel supply system SS1 for the fuel cell stack 1; FIG. 4, an exploded view of an essential portion of the fuel cell stack 1; FIG. 5, a sectional view of a unit cell 11 of the fuel cell stack 1; and FIG. 6, a phase diagram of an air electrode 11c of the unit cell 11.

The fuel cell system FC (FIGS. 1 to 3) includes: the fuel cell stack 1 (FIGS. 1 to 3); a utility supply system SS (FIGS. 1 to 4) for the fuel cell stack 1; a utility discharge system DS (FIGS. 1 to 4) of the fuel cell stack 1; and a fuel cell system controller 40 (FIG. 3) for controlling an entirety of the fuel cell system FC.

The fuel cell stack 1 is configured as a lamination of a plurality of unit cells 11 (FIGS. 1, and 3 to 5) separated by intervening fuel cell separators 12 (FIGS. 1, 3, and 4) made of carbon or metal.

The utility supply system SS is configured as a fluid supplier or supply means for supplying a respective unit cell 11 (FIGS. 1, and 3 to 5) of the fuel cell stack 1 with, as well as for adequate distribution therein of, necessary utilities as fluids (i.e. gas, mist, steam, and/or liquid) for the electrochemical generation of electric power, or in other words: a fuel (a humidified hydrogen gas in this embodiment, which may be substituted by a vapor of methane, methanol, or any hydrocarbon else that can serve as a fuel); an oxidizer (the air as a humidified oxidizing gas in this embodiment); an antioxidant as a mediator (referred herein sometimes simply to "antioxidant"); and a coolant (cooling water in this embodiment).

The utility discharge system DS is configured as a fluid discharger or discharge means for: collecting, from respective unit cells 11 of the fuel cell stack 1, such utilities that are left unreacted therein (e.g., constituents of air [in particular, nitrogen and oxygen], hydrogen gas, and antioxidant) and such utilities that have been used therein for power generation or anti-oxidation (e.g., cooling water or antioxidant), together with reaction products in the unit cells 11 (e.g., water, carbon dioxide gas, and nitrogen gas); and discharging them out of the fuel cell stack 1, as circumstances permit.

The fuel cell system controller 40 is configured for controlling various actions of the fuel cell stack 1, utility supply system SS, and utility discharge system DS, to govern or manage them, as necessary.

The fuel cell stack 1 has a structure in which: a lamination (in a rectangular parallelepiped form [striped portion in FIG. 2] in this embodiment) of a specified number of unit cells 11 and intervening separators 12 in between is held between, and pressed by, front and rear flanged end plates 2 (FIGS. 2 and 3) tight-attached respectively to front and rear end faces of the lamination; and the front and rear end plates 2 are tied to each other by frame members (L-shaped frames in FIG. 2) extending along top and bottom pairs of left and right lateral edges of the lamination, and fastened to be tightened by bolts 3 (FIG. 2), as necessary.

The front end plate 2 is formed as a manifold member having at least: a fuel supplying through hole 2a (FIG. 3); a fuel discharging through hole 2b (FIG. 3); an oxidizer supplying through hole 2c (FIG. 3); an oxidizer discharging through hole 2d (FIG. 3); a coolant supplying through hole 2e (FIG. 3); and a coolant discharging through hole 2f (FIG. 3).

The front end plate 2 has fixed on the front side: an upper and a lower fuel path connection port 4 (FIG. 2) communicating with the fuel supplying through hole 2a and the fuel discharging through hole 2b, respectively; an upper and a lower oxidizer path connection port 5 (FIG. 2) communicating with the oxidizer supplying through hole 2c and the oxidizer discharging through hole 2d, respectively, and an upper and a lower coolant path connection port 6 (FIG. 2) communicating with the coolant supplying through hole 2e and the coolant discharging through hole 2f, respectively.

The separators 12 are each formed as a manifold member having: fuel distribution paths 12a (a through hole [FIG. 3] and a rear side distribution groove [FIG. 4]) communicating with the fuel supplying through hole 2a; fuel collection paths 12b (a through hole [FIG. 3] and a rear side collection groove [FIG. 4]) communicating with the fuel discharging through hole 2b; oxidizer distribution paths 12c (a through hole [FIG. 3] and a front side distribution groove [FIGS. 3 and 4]) communicating with the oxidizer supplying through hole 2c; oxidizer collection paths 12d (a through hole [FIG. 3] and a front side collection groove [FIGS. 3 and 4]) communicating with the oxidizer discharging through hole 2d; coolant distribution paths 12e (a through hole [FIG. 3] and a front and a rear side distribution groove [FIGS. 3, 4]) communicating with the coolant supplying through hole 2e; and coolant collection paths 12f (a through hole [FIG. 3] and a front and a rear side collection groove [FIG. 3]) communicating with the coolant discharging through hole 2f.

In each separator 12, the fuel distribution paths 12a, oxidizer distribution paths 12c, and coolant distribution paths 12e have their sets of distribution grooves respectively branched in an array, tree, and/or network, and connected to corresponding sets of collection grooves of the fuel collection paths 12b, oxidizer collection paths 12d, and coolant collection paths 12f that are respectively branched in an array, tree, and/or network.

For each separator 12, respective sets of distribution grooves and collection grooves of fuel or oxidizer are arranged in positions to face a front or a rear of an associated unit cell 11, communicating with a fuel electrode 11b (FIG. 5) or an oxidizer electrode (referred herein to "air electrode") 11c (FIGS. 5 and 6) of the unit cell 11, through a gas diffusion layer made of a carbon paper or woven carbon cloth. This diffusion layer may be omitted for direct communication therebetween.

It is noted that, as sometimes used herein, a collective term "flow path" will refer to an arbitrary portion (i.e. an entirety or part thereof) of any one of fluid flow paths respectively including connection ports 4, 5, and 6 and through holes 2a and 2b, 2c and 2d, and 2e and 2f of the front end plate 2, and distribution paths 12a, 12c, and 12e and collection paths 12b, 12d, and 12f of the separators 12.

Any separator 12 may be configured as a pair of front and rear separator members pressed and/or machined in a corrugated or concavo-convex form and joined together, defining flow paths for an oxidizer by a front side of the front separator member, for a coolant by combination of a rear side of the front separator member and a front side of the rear separator member, and for a fuel containing antioxidant by a rear side of the rear separator member.

Each unit cell 11 is configured as an MEA (Membrane Electrode Assembly) having a solid polymer electrolyte membrane 11a (FIG. 5) provided on a front side thereof with a fuel electrode 11b, and on a rear side thereof with an air electrode 11c.

The fuel electrode 11b and the air electrode 11c are connected, via separators 12 contacting them and a series-parallel circuit (not shown), to an external circuit including an electric load 13 (FIGS. 1 and 5).

The solid polymer electrolyte membrane 11a is made by a film of perfluorocarbon polymer having sulfonate group (trade name: Nafion® by Du Pont Co., U.S.A.), but is not limited thereto.

The fuel electrode 11b and the air electrode 11c are each respectively made by a layer of a catalyst in which catalytic particles made of platinum are held by carbon. The fuel electrode 11b is adapted to work as an electrode, by its contact with fuel (humidified hydrogen gas) supplied through fuel flow paths 2a and 12a. The air electrode 11c is adapted to work as an electrode, by its contact with oxidizer (humidified air) supplied through oxidizer flow paths 2c and 12c.

Figure 6:
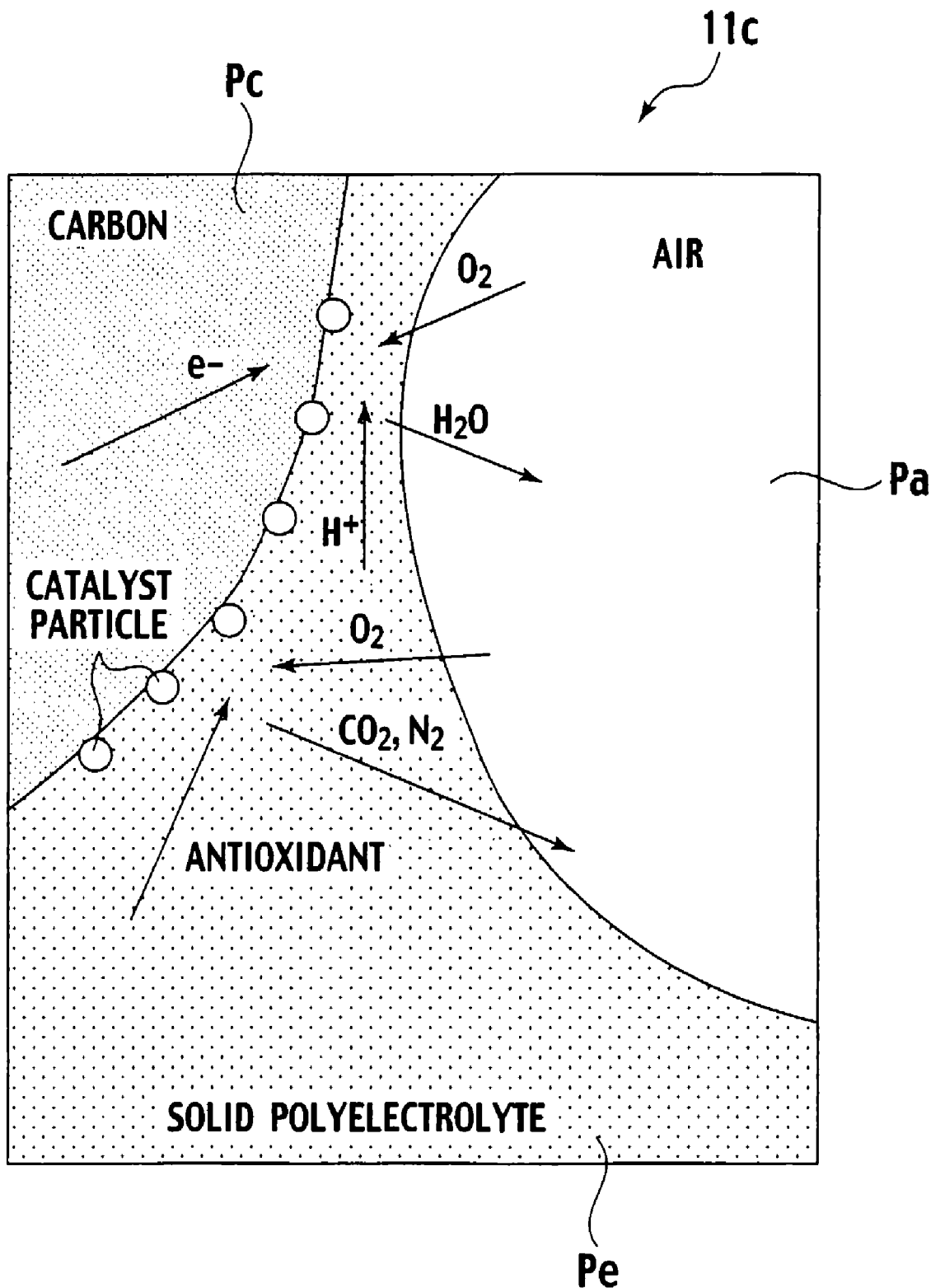
FIG. 6 is a phase diagram of an air electrode of the unit cell of FIG. 5.

As illustrated in FIGS. 5 and 6, at the fuel electrode 11b, under catalysis of platinum, hydrogen molecule ($2H_2$) changes into hydrogen ions (protons: $4H^+$), by releasing its electrons ($4e^-$). These electrons are conducted to the external circuit, while the hydrogen ions drift to move to the air electrode 11c through the solid polymer electrolyte membrane 11a. At the air electrode 11c, hydrogen ions ($4H^+$) having moved there capture electrons ($4e^-$) introduced from the external circuit, and under catalysis of platinum, bind to oxygen ($O_2$), producing water ($2H_2O$).

As illustrated in FIG. 5, an antioxidant is supplied as a carrier gas (in terms of a vapor of antioxidant mixed in a carrier gas as a mixture of hydrogen gas and vapor of water for humidification), through fuel flow paths 2a and 12a, to the fuel electrode 11b (as in FIG. 5), where it exhibits antioxidative effects, as will be detailed.

The antioxidant then moves to the air electrode 11c, as illustrated in FIGS. 5 and 6, through a phase region of solid polyelectrolyte Pe (FIG. 6) in the solid polymer electrolyte membrane 11a.

To this point, in the PEFC, as illustrated in FIG. 6, oxygen ($O_2$) in a phase region of air Pa (FIG. 6) of the air electrode 11c may be activated by its contact with catalytic particles of platinum on electrode carbon Pc (FIG. 6), constituting a potential anxiety about a break of C—F bond of solid polyelectrolyte Pe by active oxygen thus generated. However, according to this embodiment in which an antioxidant moves through solid polyelectrolyte Pe, such active oxygen is decomposed to be inactive by the antioxidant, thus allowing for a moderated anxiety.

This reaction by antioxidant generates carbon dioxide and/or nitrogen gas.

Those fluids (hydrogen gas, air components, humidifying water, and antioxidant) left unreacted in respective electrodes 11b and 11c are collected, together with antioxidant having exhibited antioxidative actions in fuel flow paths 2a and 12a and action products (water, carbon dioxide, and nitrogen gas) of air electrodes 11c, through associated fuel flow paths 12b and 2b and oxidizer flow paths 12d and 2d, to be discharged out of the fuel cell stack 1.

The coolant (cooling water) is supplied and distributed, through coolant flow paths 2e and 12e at the supply side, to and inside respective unit cells 11, and collected to be discharged through coolant flow paths 12f and 2f at the discharge side. It is noted that coolant flow paths 12e and 12f are independent of flow paths for other utilities.

The utility supply system SS includes a fuel supply system SS1 (FIGS. 1 to 5), a coolant supply system SS2 (FIGS. 2 and 3), and an oxidizer supply system SS3 (FIGS. 1 to 5). The fuel supply system SS1 is configured to supply a fuel (i.e. humidified hydrogen gas) containing an antioxidant, through the fuel supplying through hole 2a in the front end plate 2, to the fuel electrode 11b of each unit cell 11. The coolant supply system SS2 is configured to supply a coolant (i.e. cooling water) inside each unit cell 11, through the coolant supplying through hole 2e. The oxidizer supply system SS3 is configured to supply an oxidizer (i.e. air as humidified oxidizer gas) to the air electrode 11c of each unit cell 11, through the oxidizer supplying through hole 2c. The utility supply system SS has flow paths, as necessary for supply of utilities from the front end plate 2 to the fuel and air electrodes 11b and 11c of each unit cell 11 (see FIGS. 4 and 5).

The fuel supply system SS1 has a fuel-supplying bubbler 20 (FIGS. 1 and 3) configured for bubbling B (FIG. 3) water for humidification, in which an adequate amount of antioxidant is mixed, by using the fuel (hydrogen gas) as a carrier gas for the bubbling, to thereby provide a humidified fuel containing antioxidant.

The fuel supply system SS1 includes: a fuel supply line 22 (FIGS. 1 and 3), a humidifying water supply line 23 (FIG. 3), and an antioxidant supply line 24 (FIGS. 1 and 3) each respectively connected to the bubbler 20; and a humidified fuel supply line 25 (FIGS. 1 and 3) for connection of the bubbler 20 to the fuel cell stack 1. The fuel supply system SS1 further includes a bubbler controller 30 (FIG. 3) for controlling actions of the bubbler 20.

The fuel supply line 22 is configured for supply of fuel to the bubbler 20, from an adequate fuel source (e.g. a hydrogen tank or a hydrogen occluder), through a feed or service pump (e.g. a hydrogen gas feed pump) and a combination of pressure control valve and flow control valve.

The humidifying water supply line 23 is configured for supply of humidifying water (i.e. pure water for humidification of utilities) to the bubbler 20, from an adequate pure water source (e.g. a pure water reservoir), through a feed or service pump and a combination of pressure control valve and flow control valve.

The antioxidant supply line 24 is configured for supply of antioxidant to the bubbler 20, from an adequate antioxidant source, e.g. an antioxidant tank 15 (FIG. 1), through a liquid feed pump 16 and a combination of pressure control valve and flow control valve.

The humidified fuel supply line 25 is configured for supplying a humidified fuel containing antioxidant, as it is discharged from the bubbler 20, to the fuel cell stack 1, where it is supplied from the front end plate 2 to the fuel electrode 11b of each unit cell 11.

As illustrated in FIG. 3, the bubbler 20 includes: a container 21 sealed airtight for containing water for humidification in which an antioxidant is mixed; a humidifying water inlet pipe for introducing water for humidification from a humidifying water supply line 23 to the container 21; an antioxidant inlet pipe for introducing antioxidant from an antioxidant supply line 24 to the container 21; a fuel inlet pipe for introducing a fuel (hydrogen gas) from a fuel supply line 22 to the container 21; and a humidified fuel outlet pipe for conducting a humidified fuel from the container 21 to the humidified fuel supply line 25.

The container 21 of bubbler 20 is configured, as illustrated in FIG. 3, with: a peripheral wall 21a; a bottom wall 21b; a first top wall 21c formed to have the fuel inlet pipe and the humidified fuel outlet pipe provided therethrough, a second top wall 21d set in position lower than the first top wall 21c by height of a prescribed step, and formed to have the humidifying water inlet pipe and the antioxidant inlet pipe provided therethrough; and a partition wall 21e formed as a boundary portion between the first and second top walls 21c and 21d, and extended vertically downward to a vicinity of the bottom wall 21b, having many holes 21f pierced therethrough, the partition wall 21e partitioning an interior of the bubbler 20 into a liquid mixing part at the right in the figure, and a fuel humidifying part at the left.

The liquid mixing part of bubbler 20 is provided with an agitator 27 (FIG. 3) driven by a motor 26 (FIG. 3), and is adapted for controlling the motor 26 with a control signal C5 (FIG. 3) to thereby stir, and mix, antioxidant and humidifying water supplied to the liquid mixing part.

The fuel humidifying part of bubbler 20 has, as illustrated in FIG. 3: a liquid pressure sensor 21g for detecting a pressure of a mixture of antioxidant and humidifying water to provide a detection signal D1; a liquid temperature sensor 21h for detecting a temperature of the mixture to provide a detection signal D2; a liquid level sensor 21i for detecting a liquid level of the mixture to provide a detection signal D3; a gas pressure sensor 21j for detecting a pressure of a fuel (hydrogen gas) humidified by the mixture to provide a detection signal D4; and a gas temperature sensor 21k for detecting a temperature of the humidified fuel to provide a detection signal D5.

The fuel inlet pipe, humidifying water inlet pipe, and antioxidant inlet pipe are inserted into the container 21, to vicinities of the bottom wall 21b, while the humidified fuel outlet pipe is inserted to an underside of the first top wall 21c. The mixture of antioxidant and humidifying water has a liquid level set near an underside of the second top wall 21d during a normal run of bubbler 20. The gas pressure sensor 21j and gas temperature sensor 21k are disposed higher than the normal liquid level, and the liquid temperature sensor 21h, lower than the normal liquid level, while the liquid pressure sensor 21g is installed near the bottom wall 21b.

The fuel supply line 22, humidifying water supply line 23, antioxidant supply line 24, and humidified fuel supply line 25 of fuel supply system SS1 have: their detection elements (not shown) for detecting line pressure, temperate, and/or flow rates to provide detection signals D6, D7, D8, and D9 (FIG. 3); and their control valves (e.g. flow control valves or pressure control valves and electromagnetic shutoff valves) 22a, 23a, 24a, and 25a (FIG. 3) controlled with control signals C1, C2, C3, and C4 (FIG. 3), respectively.

The bubbler controller 30 is adapted for sampling the detection signals D1 to D9 of fuel supply system SS1, and processing sampled data, depending on commands from the fuel cell system controller 40, to output the control signals C1 to C5. Actions of bubbler 20 are thereby controlled, so that gaseous components (hydrogen, humidifying water, and antioxidant) of humidified fuel to be supplied from the humidified fuel outlet pipe 25 to the fuel cell stack 1 have their partial pressures held at desirable levels, allowing for a maintained high dew point with high precision.

The antioxidant may preferably have, in the fluid, a partial pressure within a range of 13.3 to 13332.2 Pa, or more preferably, a partial pressure within a range of 6.65 to 6666.1 Pa. If set excessively low, the partial pressure may cause an insufficient supply of antioxidant, with a resultant failure to achieve a sufficient inactivation of active oxygen. On the contrary, if set excessively high, the partial pressure may adversely affect a positive reaction of fuel cell. The above-noted partial pressure range is thus preferable.

The oxidizer supply system SS3 has an oxidizer-supplying bubbler 18 (FIG. 1) configured (identical to the fuel-supplying bubbler 20) for bubbling water for humidification, in which an adequate amount of antioxidant is mixed through a control valve (corresponding to the control valve 24a), by using an oxidizer (air) as a carrier gas for the bubbling, to thereby provide a humidified oxidizer containing antioxidant.

The oxidizer supply system SS3 includes: an oxidizer supply line 18a (FIG. 1), a humidifying water supply line 23 (not shown), and an antioxidant supply line (not shown) each respectively connected to the bubbler 18; and a humidified oxidizer supply line 18b (FIG. 1) for connection of the bubbler 18 to the fuel cell stack 1. The oxidizer supply system SS3 employs the bubbler controller 30 for controlling actions of the bubbler 18, in parallel with the bubbler 20.

The oxidizer supply line 18a is configured for supply of oxidizer to the bubbler 18, from an adequate oxidizer source (e.g. the air), through an air compressor or a pump and a combination of pressure control valve and flow control valve. The humidifying water supply line is configured for supply of humidifying water to the bubbler 18, from a pure water source, through a feed or service pump and a combination of pressure control valve and flow control valve. The antioxidant supply line is configured for supplying antioxidant to the bubbler 18, as necessary, from an adequate antioxidant source, e.g. the antioxidant tank 15, through a liquid feed pump and a combination of pressure control valve and flow control valve.

The humidified oxidizer supply line 18b is configured for supplying a humidified oxidizer containing antioxidant, as it is discharged from the bubbler 18, to the fuel cell stack 1, where it is supplied from the front end plate 2 to the air electrode 11c of each unit cell 11.

If the oxidizer supply system SS3 needs no antioxidant to be supplied, the antioxidant supply line of the oxidizer supply system SS3 as well as an antioxidant inlet pipe of the bubbler 18 is to be removed.

The utility discharge system DS includes: a fuel discharge system DS1 (FIGS. 2 to 4) connected to the fuel discharging through hole 2b of front end plate 2; a coolant discharge system DS2 (FIGS. 2 and 3) connected to the coolant discharging through hole 2f; and an oxidizer discharge system DS3 (FIGS. 1 to 5) connected to the oxidizer discharging through hole 2d. The utility discharge system DS has flow paths, as necessary for collection of fluids from the fuel and air electrodes 11b and 11c of each unit cell 11 to the front end plate 2 (see FIGS. 4 and 5).

In each unit cell 11 of fuel cell stack 1 configured as described, hydrogen gas supplied as fuel to the fuel flow path 12a and air supplied as oxidizer to the oxidizer flow path 12c are fed to the fuel electrode 11b and the air electrode 11c, respectively, where they react as shown by formulas (B1) and (B2) below.

$$\text{At the fuel electrode: } H_2 \rightarrow 2H^+ + 2e^- \tag{B1}$$

$$\text{At the air electrode: } (\tfrac{1}{2})O_2 + 2H^+ + 2e^- \rightarrow H_2O \tag{B2}$$

As illustrated in FIG. 5, with hydrogen gas fed to the fuel electrode 11b, a reaction of formula (B1) proceeds, generating $H^+$ (proton) and $e^-$ (electron). $H^+$ is hydrated to move through the solid polymer electrolyte membrane 11a to the air electrode 11c, where it reacts to e- and oxygen gas of air fed thereto, so that a reaction of formula (B2) proceeds, producing water. With an electromotive force then produced, electrons generated at the fuel electrode 11b are conducted to the air electrode 11c, via the external circuit 13, as illustrated in FIG. 5.

At the air electrode 11c, the reaction of formula (B2) appears as a generation of water by four-electron reduction of molecular oxygen ($O_2$). This four-electron reduction of oxygen accompanies concurrent side reactions that generate free radicals, such as superoxide anion ($O_2^-$) as a one-electron reduction body of oxygen, hydroperoxy radical (.OOH) as a conjugate acid of superoxide, hydrogen peroxide ($H_2O_2$) as a two-electron reduction body, and hydroxy radical (.OH) as a three-electron reduction body.

Generation mechanisms of those free radicals are considered to be complex reactions by way of such elementary reaction processes as shown by formulas (B3) to (B7) below.

$$O_2 + e^- \rightarrow O_2^- \tag{B3}$$

$$O_2^- + H^+ \rightarrow .OOH \tag{B4}$$

$$O_2 + 2H^+ + 2e^- \rightarrow H_2O_2 \tag{B5}$$

$$H_2O_2 + H^+ + e^- \rightarrow H_2O + .OH \tag{B6}$$

$$H_2O_2 \rightarrow 2.OH \tag{B7}$$

Generated active oxygen (species) are considered to be reduced finally to water, by way of such elementary reaction process as shown by formulas (B8) to (B10) below, where Eo is a standard redox potential given in terms of NHE (normal hydrogen electrode).

$$.OOH + H^+ + e^- \rightarrow H_2O_2, E^\circ = 1.50 \text{ V} \tag{B8}$$

$$H_2O_2 + 2H^+ + 2e^- \rightarrow 2H_2, E^\circ = 1.77 \text{ V} \tag{B9}$$

$$.OH + H^+ + e^- \rightarrow H_2O, E^\circ = 2.85 \text{ V} \tag{B10}$$

Now controversial is hydroxy radical that has a redox potential as high as 2.85V, and is strong in oxidizability. Hydroxy radical is most reactive among active oxygen (species), and has a very short life of one millionth second. As the oxidizability is strong, hydroxy radical reacts with another molecule, unless it is promptly reduced.

Most controversial cases of oxidative degradation may have been caused by hydroxy radical. Generation of hydroxy radical is maintained by way of formulas (B3) to (B7) during power generation of fuel cell. Hydroperoxy radical and hydrogen peroxide, though weaker in oxidizability than hydroxy radical, return on water by ways processes that may generate hydroxy radical. Like this, the generation of hydroxy radical continues semipermanently, so long as power is generated in a PEFC. The solid polymer electrolyte membrane may thus be deteriorated, unless the fuel cell is continuously supplied with a compound that can inactivate hydroxy radical.

According to the present embodiment, a fuel cell system has a fuel supply system SS1 configured as an external measures for fluid supply to a fuel cell stack 1, and adapted to supply the fuel cell stack 1 with an antioxidant of gaseous phase in addition to hydrogen as a fuel or hydrogen ion, so that even when power is generated at the fuel cell stack 1, with a continued generation of active oxygen, the fuel cell stack 1 can be supplied from outside with the antioxidant to be uninvolved in the fuel cell reaction, thus allowing for a successful inactivation and elimination of active oxygen, and a suppressed deterioration of solid polymer electrolyte membrane.

Further, an efficient inactivation of active oxygen can be maintained by the external supply of antioxidant, even in an environment where the antioxidant tends to be oxidized, thus enabling an efficient break of active oxygen into inactive oxygen or water, allowing for provision of a fuel cell system with excellent durability.

In view of the generation of active oxygen that continues semipermanently so long as power is generated in a PEFC, it is desirable to continuously supply a vapor of antioxidant to the fuel electrode or air electrode. It therefore is very effective to employ the bubbler 20 that supplies antioxidant as a vapor to the fuel electrode 11b, as well as the bubbler 18 that supplies antioxidant as a vapor to the air electrode 11c.

The antioxidant may preferably be a hydrocarbon system compound composed of four elements, being carbon, oxygen, nitrogen, and hydrogen. Other elements else than carbon, oxygen, nitrogen, and hydrogen may poison platinum in electrode, adversely affecting a power generation performance of the fuel cell. Base metal elements may promote generation of hydroxy radical.

To cover an application including oxidation in and discharge from air electrode, the antioxidant may preferably be composed simply of the four elements being carbon, oxygen, nitrogen, and hydrogen, as a hydrocarbon system compound to be decomposed into $CO_2$, $H_2O$, $N_2$, and the like.

Hydroxy radical has a very high redox potential so that, thermodynamically, most hydrocarbon compounds composed of the above-noted four elements may act as a reductant on hydroxy radical. Kinetically, those compounds may be different in reducing ability. In view of high reactivity of hydroxy radical, it is desirable for the antioxidant to be kinetically faster in activation reaction.

It also is important to consider the stability of the oxidant the antioxidant is to be oxidized to, that is, the compound to be obtained when it is oxidized by active oxygen. If the oxidant of antioxidant is unstable, the oxidized substance may act as an initiator of new side reaction, promoting the deterioration of electrolyte membrane.

As compounds kinetically relatively fast in inactivation reaction and chemically stable in the state of oxidant, there may be taken: secondary alcohol system compounds having hydroxyl group, such as isopropanol, 2-butanol, and cyclohexanol; and nitrogen-containing system compounds, such as propylamine, diethylamine, acetamide, aniline, and N-hydroxy system compound.

In selection of such compounds, the stability, durability, and heat resistance of compound are important. In particular, the stability and durability of compound are most important for the inactivation of active oxygen to be maintained to use a fuel cell over a long term.

Preferably, hydrolysate of oxidant of antioxidant should also be chemically stable. For inactivation of active oxygen, it should be effective if the antioxidant supplied to the fuel electrode be kept stable till its discharge from the air electrode. Antioxidant used for inactivation of active oxygen is discharged together with produced water, and for a long-term operation of the system, the hydrolysate of antioxidant may preferably be stable without generating radicals.

For the operating temperature of fuel cell to be within a range of 80 to 90° C. in normal run, and for the heat resistance of electrolyte membrane to be enhanced in future, the antioxidant may preferably be stable in heat resistance up to a temperature about 120° C.

For effective inactivation of active oxygen, the antioxidant should be such a compound that can be oxidized by hydroxy radical at least promptly, i.e., a compound that has an oxidation potential of 2.85V or less, and preferably, should not simply be oxidized, but exhibit a redox reversibility, as well.

The antioxidant may preferably have a redox potential within a range of 0.68V or more and 1.77V or less in NHE. 0.68V (NHE) is a potential where hydrogen peroxide acts as a reducing agent, and an equivalent or higher redox potential permits an oxidant of the antioxidant, as it has once oxidized hydrogen peroxide, to return to its original form to again oxide hydrogen peroxide, with an enhanced efficiency. 1.77V (NHE) is a potential where hydrogen peroxide acts as an oxidizing agent, and a higher redox potential may cause an oxidant of the antioxidant to act as a new oxidizing agent, oxidizing electrolyte membrane or such, thus affecting adversely.

For the oxidizability of antioxidant to be decreased, the antioxidant may preferably have a redox potential of 1.00V or less.

A fluorine system film may be used as an electrolyte membrane. In this case, the potential where the fluorine system electrolyte membrane is to be oxidized ranges 2.5V or more, and if the redox potential of antioxidant is 1.00V, the electrolyte membrane is kept from being oxidized, there being no problem.

A hydrocarbon system film may be used as an electrolyte membrane. In this case, the hydrocarbon system electrolyte membrane may be oxidized when the redox potential of antioxidant exceeds 1.00V. Substituting typical organic compounds therefor, benzene is to be oxidized at 2.00V, toluene is at 1.93V, and xylene is at 1.58V. Hydrocarbon system electrolyte membrane is thus oxidized at a lower redox potential than fluorine system electrolyte membrane.

Therefore, by setting the redox potential of antioxidant within a range of 1.00V or less, the electrolyte membrane can be kept from being oxidized, allowing for a long service, even in use of a hydrocarbon system film. It is noted that the actual redox potential (RHE: real hydrogen electrode) changes depending associated conditions, such as pH and temperature, and a selection may preferably be made within a matching range.

For fuel cells, preventing oxidation, while generating power, needs consideration to the electrolytic oxidation. A situation is now suppose, in which a compound employed as an antioxidant for reducing active oxygen to water is supplied to an electrolyte, from the side of an electrode. The compound may then be oxidized by electrolytic oxidation in the electrode, thus having an oxidized state to enter the electrolyte. That is, the compound may be oxidized by electrolytic oxidation before it enters the electrolyte, of which the possibility increases, in particular when the compound has a potential under 1.23V (NHE) that is a theoretical voltage of PEFC.

The compound has a function as an antioxidant, which is lost when the compound is oxidized by electrolytic oxidation, and will not come back unless the compound has a reversible redox-ability. If the compound has a reversible redox-ability, hydrogen peroxide or the like can be used as a reducing agent for recovery of the compound as a reductant to have the function as an antioxidant come back.

From such point of view, as well, the amount of a compound to be supplied as antioxidant may be reduced, if the compound has a reversible redox-ability. Moreover, in use of an antioxidant that has a reversible redox-ability, the antioxidant may be positively reduced by electrolytic oxidation, to thereby implement a method of inactivating hydrogen peroxide without passing hydroxy radical generating processes, allowing for the more effective inactivation of active oxygen.

The antioxidant may preferably be a compound represented by general formula (I) below, where X denotes an oxygen atom or hydroxyl group, and Y1 and Y2, identical or different methyl groups or ethyl groups.

(I)

More preferably, the antioxidant should be a compound represented by general formula (IIa) or (IIb) below.

(IIa)

(IIb)

More preferably, the antioxidant should be a compound represented by general formula (IIIa) or (IIIb) below.

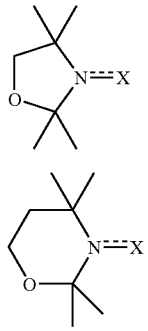

(IIIa)

(IIIb)

Those compounds represented by the general formula (I), (IIa), (IIb), (IIIa), or (IIIb) have suitable vapor pressures and redox-abilities within a temperature range from a room temperature to 120° C. as a maximum working temperature of fuel cell.

Figure 7:
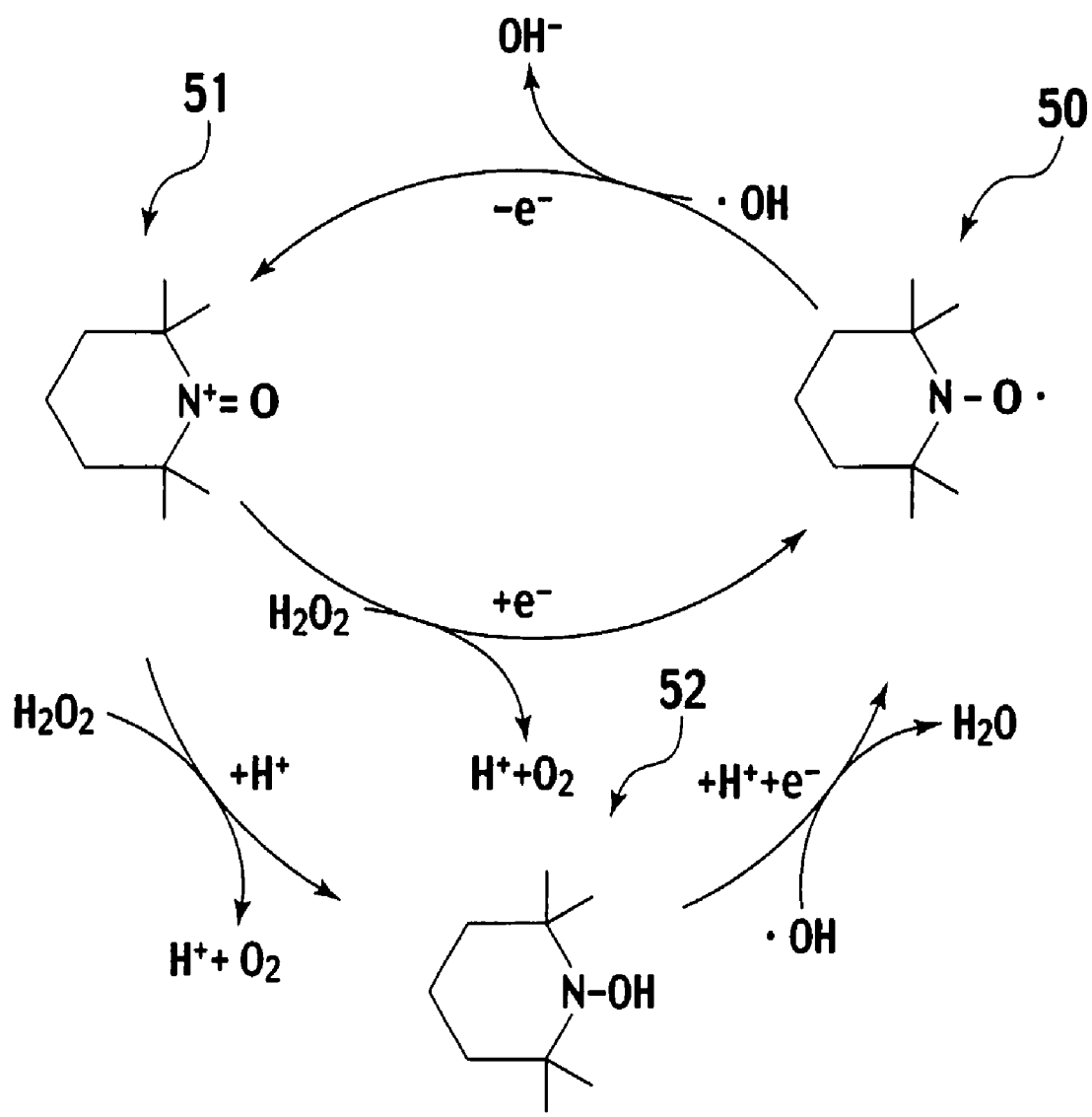
FIG. 7 is a cyclic flow diagram showing the mechanism of disappearance of active oxygen by TEMPO.

As an example of antioxidant, TEMPO (2,2,6,6-tetramethylpiperidine-1-oxyl) may be taken. FIG. 7 show a redox cycle of TEMPO, and illustrates a mechanism of inactivation of hydrogen peroxide and hydroxy radical by TEMPO. TEMPO is an N-hydroxy compound that has a reversible redox cycle, whereby oxygen is reduced finally to water.

Hydrogen peroxide acts: as a reducing agent, as in the before-mentioned formula (B9), on those substances which have a higher redox potential than hydrogen peroxide; and as an oxidant, as in formula (B11) below, on those substances which have a lower redox potential than hydrogen peroxide.

$$H_2O_2 \rightarrow O_2 + 2H^+ + 2e^-, E°=0.68 V \tag{B11}$$

TEMPO is an N-hydroxy imide derivative that has a reversible redox cycle, and performs an oxidation and a reduction respectively including elementary reaction processes shown by formulas (B12) and (B13) below.

$$TEMPO^+ + e^- \rightarrow TEMPO, E°=0.81 V \tag{B12}$$

$$TEMPO \rightarrow TEMPO^+ + e^-, E°=0.81 V \tag{B13}$$

TEMPO has a redox potential of 0.81V, which higher than the redox potential (0.68V) of hydrogen peroxide, and lower than that (2.85 V) of hydroxy radical.

Therefore, an N-oxyl radical 50 (FIG. 7) of TEMPO, that is, a reductant TEMPO 50 acts as a reducing agent on a hydroxy radical (.OH) generated in the electrolyte membrane, i.e., supplies an electron ($e^-$) to the hydroxy radical, changing to an oxidant TEMPO$^+$ 51 (FIG. 7), whereby the hydroxy radical is reduced to a hydroxyl (OH$^-$), as shown by formula (B14) below.

$$TEMPO+.OH \rightarrow TEMPO^+ + OH^- \tag{B14}$$

The oxidant TEMPO$^+$ 51 acts as an oxidizing agent on hydrogen peroxide, i.e., performs an oxidation reaction in a direction in which hydrogen peroxide releases hydrogen and changes to oxygen, to thereby recover the state of a reductant TEMPO 50.

The recovery from oxidant TEMPO$^+$ 51 to reductant TEMPO 50 is considered to develop by two routes: one including a reaction process directly proceeding to the reductant TEMPO 50, as shown by formula (B15) below, and the other including reaction processes indirectly proceeding to the reductant TEMPO 50, once passing an intermediate (TEMPO-H) 52 (FIG. 7), as shown by formulas (B16) and (B17) below.

$$2TEMPO^+ + H_2O_2 \rightarrow 2TEMPO + 2H^+ + O_2 \tag{B15}$$

$$TEMPO^+ + H_2O_2 \rightarrow TEMPO\text{-}H + H^+ + O_2 \tag{B16}$$

$$TEMPO\text{-}H + .OH \rightarrow TEMPO + H_2O \tag{B17}$$

The TEMPO 50, as it has recovered, again acts to reduce hydroxy radical. Thus, there is a redox cycle repeated between reductant TEMPO 50 and oxidant TEMPO$^+$ 51, whereby hydroxy radical as well as hydrogen peroxide is inactivated, and oxidation of electrolyte is prevented.

In a situation that a quantity of reductant TEMPO 50 is supplied from the fuel electrode of fuel cell; part of the supplied quantity may be oxidized on catalyst of the fuel electrode, by electrolytic oxidation shown by the formula (B13), and diffused as oxidant TEMPO$^+$ 51 in the electrolyte. However, this oxidant TEMPO$^+$ 51 changes by having hydrogen peroxide acting thereon as a reducing agent, directly or indirectly via intermediate TEMPO-H 52, to recover the state of reductant TEMPO 50, which functions again as an antioxidant that can reduce hydroxy radical.

Unless the supplied compound has a reversible redox cycle, its antioxidation function is lost when it has reduced hydroxy radical, so that it will no more function as an antioxidant. However, if the compound has a reversible redox cycle, the reversibility of the redox cycle allows the function it has as an antioxidant to be kept to some extent.

According to the embodiment described, a fuel cell system is configured with a PEFC, and a fluid supply for supplying the PEFC with a fluid containing an antioxidant of a gaseous phase, allowing for an efficient decomposition of active oxygen into inactive oxygen or water, and excellent durability.

The present embodiment covers a fuel cell system of a PEFC type, but the type of fuel is not limited, and may well be applied to fuel cell systems using various fuels, such as a hydrogenic solid polymer fuel cell, a direct methanol type solid polymer fuel cell, and a direct hydrocarbon type solid polymer fuel cell, providing that a proton-exchange type polymer electrolyte membrane is employed.

A fuel cell system according to the embodiment may be mounted on a fuel cell vehicle, as an application thereof. The fuel cell vehicle is allowed to endure a continuous run over a long time, by mounting thereon a fuel cell system according to the embodiment.

A fuel cell system according to the invention may have applications thereof not limited to a fuel cell vehicle, and is applicable, for example, to a fuel cell cogeneration power generating system, a fuel cell home electric appliance, a fuel cell portable device, a fuel cell transport machine, and the like.

EXAMPLES

Description will be made of fuel cell systems according to examples 1 to 4 and comparative examples 1 and 2 of embodiment of the invention, while the scope of the invention is not limited thereto. Those examples exemplify fuel cell systems using different antioxidants, examining their effectiveness.

<Sample Preparation>

Example 1

A film of Nafion® 117 (175 μm thick) of Du Pont Co. was cut into 1 cm squares to be used as solid polymer electrolyte membranes. Nafion® membranes were pretreated to the NEDO PEFC R&D project standard treatment, where they were boiled: in 3% hydrogen peroxide aqueous solution for 1 hour, and in distilled water for 1 hour, then, in 1M sulfuric acid solution for 1 hour, and finally, in distilled water for 1 hour, in this order.

Next, for a facilitated ageing resistance judgment in endurance test, pretreated Nafion® membranes were subjected to an ion exchange treatment, where they were soaked in 100 mM $FeSO_4$ aqueous solution for one night or more, and ultrasonically cleaned in distilled water for 15 minutes, for removing ions adhering to membrane to thereby exchange counter ions of Nafion® from $H^+$ to $Fe^{2+}$. Wako pure medicine high grade $FeSO_4.7H_2O$ was used as a reagent.

Next, platinum-supporting carbon (20 wt % Pt/Vulcan XC-72, Cabot Co.) was coated 1 mg/cm2 on both sides of each ion-exchanged electrolyte membrane to fabricate a membrane electrode assembly (MEA). Fabricated MEA was assembled in a single cell, to provide a unit cell for PEFC to be 5 $cm^2$.

Using a feed pump, 10 mM TEMPO aqueous solution was fed as an antioxidant by a flow rate of 1 $cm^3$/minute to a bubbler at the fuel electrode end of the unit cell. TEMPO (melting point 36 to 38° C.), solid under normal temperature, was dissolved in water to be fed to the bubbler, for a facilitated handling in a sense, while it may be heated, and pumped as a raw liquid.

Humidified hydrogen gas (70° C., atmospheric pressure) as a fuel and humidified oxygen gas (70° C., atmospheric pressure) as an oxidizer were supplied, through fuel and oxidizer supply lines provided with bubblers, to a fuel electrode and an air electrode of the unit cell, respectively. The unit cell had a temperature controlled to 70° C.

Example 2

DTBN (di-t-butylnitroxide) aqueous solution was used as an antioxidant, treatment was like to example 1.10 mM aqueous solution of DTBN was prepared and fed, for a supply concentration to be controlled. DTBN, liquid at normal temperature, may be pumped as a raw liquid.

Example 3

An S-PES (sulfonated polyethersulfone) film was employed for preparation of solid polymer electrolyte membranes in example 3, as well as in example 4. This film is equivalent to that described in "researches and developments of a durability-elevated hydrocarbon system electrolyte membrane for proton-exchange membrane fuel cells in the proton-exchange membrane fuel cell elements technology development and like program in the proton-exchange membrane fuel cell system technology project", p. 31, 2002 yearly results report of the New Energy and Industrial Technology Development Organization of Japan.

A film of S-PES (170 μm thick) was cut into 1 cm squares to be used as solid polymer electrolyte membranes, and platinum-supporting carbon (20 wt % Pt/Vulcan XC-72, Cabot Co.) was coated 1 mg/cm2 on both sides of each S-PES membrane to fabricate a membrane electrode assembly (MEA). Fabricated MEA was assembled in a single cell, to provide a unit cell for PEFC to be 5 $cm^2$.

Using a feed pump, 10 mM TEMPO aqueous solution was fed as an antioxidant by a flow rate of 1 $cm^3$/minute to a bubbler at the fuel electrode end of the unit cell.

Humidified hydrogen gas (70° C., atmospheric pressure) as a fuel and humidified oxygen gas (70° C., atmospheric pressure) as an oxidizer were supplied, through fuel and oxidizer supply lines provided with bubblers, to a fuel electrode and an air electrode of the unit cell, respectively. The unit cell had a temperature controlled to 70° C.

Example 4

DTBN aqueous solution, substituting for TEMPO aqueous solution, was used as an antioxidant, treatment was like to example 3.

Comparative Example 1

Comparative example 1 was set to the example 1, as it had no antioxidant aqueous solution fed.

Comparative Example 2

Comparative example 2 was set to the example 3, as it had no antioxidant aqueous solution fed.

Samples of the foregoing examples were evaluated, as follows:

<Measurements of Redox Potential>

Figure 8:
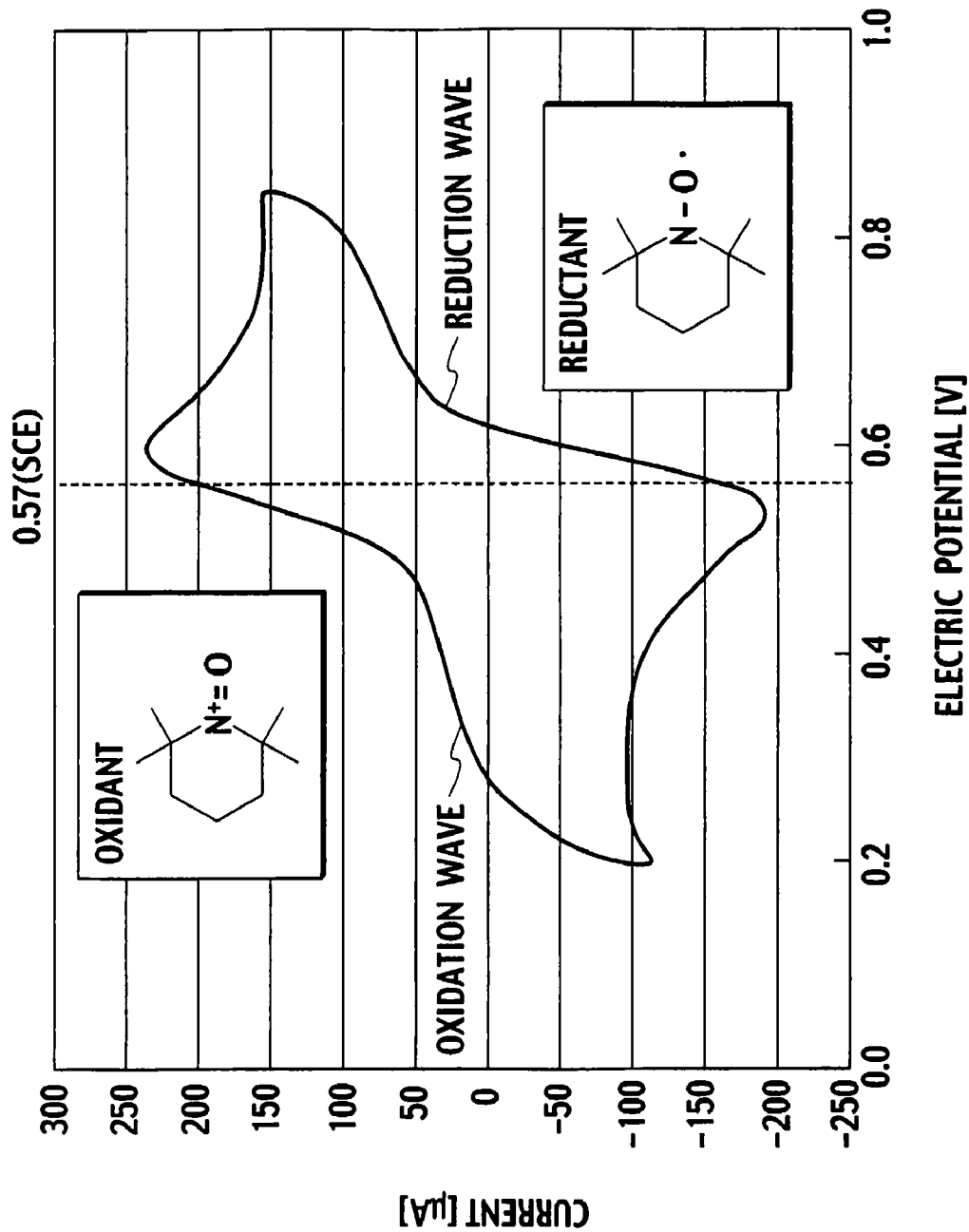
FIG. 8 is a cyclic voltammogram of an electrode reaction of TEMPO.

Redox potentials of the compounds employed in those examples were measured by using: glassy carbon as an acting electrode; platinum as a counter electrode; a saturated calomel electrode (SCE) as a reference electrode; and 1M sulfuric acid as an electrolytic solution. FIG. 8 shows exemplary measurements of TEMPO. To the SCE, a redox potential E(SCE) was measured, which has a relationship to the standard potential E° (NHE), as shown by expression (C1) below.

$$E°(NHE)=E(SCE)+0.24V \quad (C1)$$

FIG. 8 teaches that TEMPO has a redox potential E(SCE) near 0.57V, which means TEMPO is an compound that can act as a reducing agent on hydroxy radical and as an oxidizing agent on hydrogen peroxide, thus meeting the objective of embodiment of the invention described.

<Start and Stop Repeating Endurance Test>

For the fuel cell to be tested, an open-circuit condition was held for 30 minutes to start the test. In the test, supplying a gas flow of 300 $dm^3$/minutes to the unit cell, the current density was increased from an initial state of discharge until the terminal voltage drops to a level of 0.3 V or less, and after this level of terminal voltage was reached, the fuel cell was again changed to the open circuit condition, which was held for 5 minutes.

This operation was repeated, counting the number of times of repetition, and the durability of unit cell to be compared was defined as the number of repetition times counted upon a voltage drop to a level of 0.4 V or less under a condition of power generation with a current density of 1 $mA/cm^3$.

Figure 9:
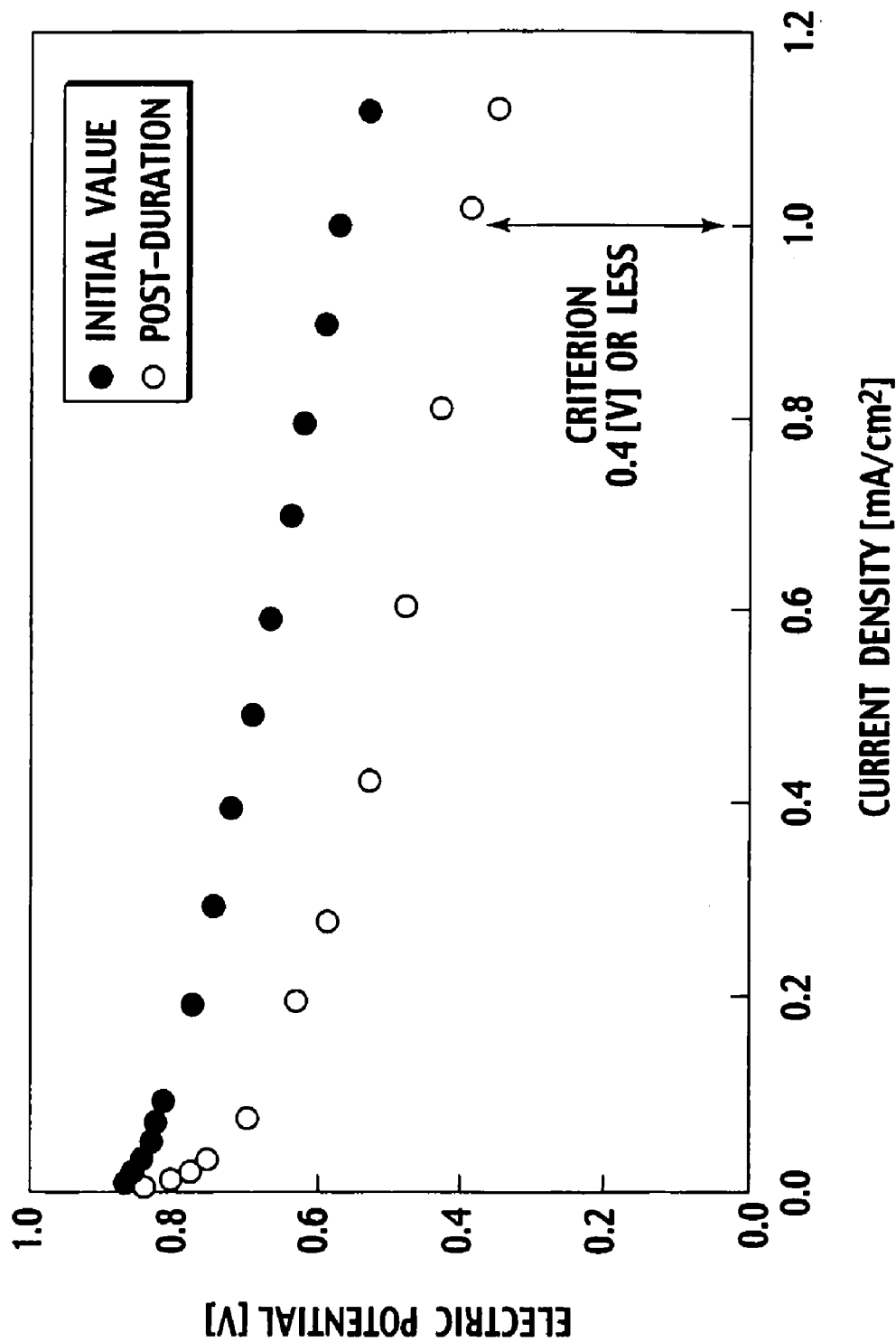
FIG. 9 is a graph showing results of a start and stop repeating endurance test.

FIG. 9 illustrates, in a graph, voltage (as potential) vs. current (in density) characteristic values in an initial phase of, as well as after, the start and stop repeating endurance test of a unit cell according to the example 1. In this graph, under a condition of power generation with a current density of 1 $mA/cm^3$, a voltage level of 0.4 V or less is reached at a certain number of times of repetition, which is referred to "start-stop repetition time number".

<Analysis of Emitted Substances at Air Electrode>

For analysis of deterioration of Nafion® membrane, measurements were made of concentrations of fluoride ions and sulfate ions emitted upon decomposition of the membrane. For S-PES membrane, concentration measurements were made of sulfate ions emitted upon membrane: decomposition. For detection of transferred ions, discharged liquid from the air electrode was collected, and measured by using an ion chromatograph. The ion chromatograph was a Daionecc Co. make (model name: CX-120).

As a specific test method for respective examples, as well as for comparative examples, comparison was made of samples of liquid discharged from the air electrode upon a completion of 100 times of repetition in the start and stop repeating endurance test. Further, gases emitted at the air electrode were measured by using a gas chromatograph mass specrometer. The gas chromatograph mass spectrometer was a Shimadzu Co. make (GCMS-QP5050).

For the examples 1 to 4 and comparative examples 1 and 2, the type of electrolyte membrane, supplied antioxidant, redox potential of antioxidant, start-stop repetition time number, and presence or absence of fluoride ion, sulfate ion, and carbon dioxide are listed in Table 1 below.

| | Electrolyte membrane | Antioxidant | Redox potential | Repetition time no. | Fluoride ion | Sulfate ion | $CO_2$ |
|---|---|---|---|---|---|---|---|
| Example 1 | Nafion ® | TEMPO | 0.81 | 1,530 | X | X | ○ |
| Example 2 | Nafion ® | DTEN | 0.80 | 1,480 | X | X | ○ |
| Example 3 | S-PES | TEMPO | 0.81 | 750 | — | X | ○ |
| Example 4 | S-PES | DTEN | 0.80 | 710 | — | X | ○ |
| Com. Ex 1 | Nafion ® | — | — | 120 | ○ | ○ | X |
| Com. Ex 2 | S-PES | — | — | 80 | — | ○ | X |

○: present, X: absent

The antioxidant employed in the example 1 and that in the example 2 have their redox potentials within a range of a potential of 0.68V (NHE) where hydrogen peroxide acts as an oxidizing agent and a potential of 1.77V (NHE) where hydrogen peroxide acts as a reducing agent, thus meeting the objective of embodiment of the invention described.

For the comparative example 1 where no antioxidant was supplied, the start and stop repeating endurance test showed, at a start-stop ration time number of 120, a voltage drop to a level of 0.4 V or less under a condition of power generation with a current density of 1 mA/cm³.

On the contrary, in each of examples 1 and 2 where an antioxidant was supplied, a voltage drop to a level of 0.4 V or less was observed near a start-stop repetition time number of 1,500, proving a suppressed deterioration of solid polymer electrolyte membrane by addition of the antioxidant, with an enhanced durability.

The examples 3 and 4 observed a voltage drop to a level of 0.4 V or less a start-stop repetition time number over 700, with a proved improvement of durability by suppressed deterioration of electrolyte membrane.

Ion chromatograph analyses revealed a detection of fluoride ion and sulfate ion in the comparative example 1, and a detection of sulfate ion in the comparative example 2, supporting a deterioration by decomposition of electrolyte membrane.

On the contrary, in each of examples 1 and 2, emission of fluoride ion and sulfate ion was below detection limits, proving a suppressed decomposition of Nafion® membrane by introduction of antioxidant.

In each of examples 3 and 4, as well, emission of sulfate ion was below detection limits, proving a suppressed decomposition of S-PES membrane by introduction of antioxidant.

For the examples 1 and 2 where an antioxidant was supplied, measurements by gas chromatograph mass spectrometer revealed a detection of $CO_2$, supporting that the antioxidant, as it had been introduced from the fuel electrode and served for inactivation of active oxygen, was oxidized at the air electrode, emitting $CO_2$.

Although perfluorosulfonic acid system polymers typified by the Nafion® film having wide application to an electrolyte membrane of a fuel cell in a fuel cell system, as well as hydrocarbon system polymers referred to S-PES, are put in a situation where they are unsuccessfully considered having a sufficient tolerance by generation of active oxygen at an air electrode of the fuel cell, as will be seen from the foregoing description, by supplying an antioxidant according to an embodiment of the invention, active oxygen can be inactivated even if the generation is continuous, thus enabling a prevention of deterioration of the electrolyte membrane, allowing for an enhanced durability of fuel cell system.

The contents of Japanese Patent Application No. 2005-362178, filed on Dec. 15, 2005, are incorporated herein by reference.

While preferred embodiments of the present invention have been described using specific terms, such description is for illusive purposes, and it is to be understood that changes and variations may be made without departing from the spirit or scope of the following claims.

INDUSTRIAL APPLICABILITY

The present invention provides a fuel cell system, and an operating method for a fuel cell system, with an enhanced durability by inactivation of active oxygen. The invention implements a fuel cell vehicle endurable with a continuous run over long time.

The invention claimed is:

1. A fuel cell system comprising:
   a proton-exchange membrane fuel cell; and
   a fluid supply configured to supply the fuel cell with a gaseous fluid containing an antioxidant of a gaseous phase,
   wherein the fluid contains as a carrier gas of the antioxidant, a fuel or an oxidizer to be supplied to the fuel cell.

2. The fuel cell system as claimed in claim 1, wherein the antioxidant has a partial pressure within a range of 13.3 to 13332.2 Pa in the fluid.

3. The fuel cell system as claimed in claim 1, wherein the antioxidant has a partial pressure within a range of 6.65 to 6666.1 Pa in the fluid.

4. The fuel cell system as claimed in claim 1, wherein the fluid supply comprises a bubbler configured to bubble a liquid containing the antioxidant and humidifying water by the carrier gas to supply the fluid.

5. The fuel cell system as claimed in claim 1, wherein the antioxidant comprises a hydrocarbon system compound composed of carbon, oxygen, nitrogen, and hydrogen.

6. The fuel cell system as claimed in claim 5, wherein an oxidant of the antioxidant is changed to a chemically stable hydrolysate.

7. The fuel cell system as claimed in claim 5, wherein the antioxidant has a reversible redox-ability, and an oxidant of the antioxidant is chemically stable.

8. The fuel cell system as claimed in claim 5, wherein the antioxidant or an oxidant thereof is changed by oxidation by a catalyst in an air electrode of the fuel cell to $CO_2$, $H_2O$, or $N_2$ to be discharged.

9. The fuel cell system as claimed in claim 5, wherein the antioxidant has a standard oxidation-reduction potential greater than 0.68 V (NHE) and smaller than 1.77 V (NHE).

10. The fuel cell system as claimed in claim 5, wherein the antioxidant has a standard oxidation-reduction potential greater than 0.68 V (NHE) and smaller than 1.00 V (NHE).

11. The fuel cell system as claimed in claim 10, wherein the antioxidant comprises a compound represented by a general formula (I) below

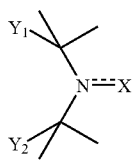

(I)

where X denotes an oxygen atom or hydroxyl group, and Y1 and Y2, identical or different methyl groups or ethyl groups.

12. The fuel cell system as claimed in claim 10, wherein the antioxidant comprises a compound represented by a general formula (IIa) or (IIb) below

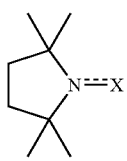

(IIa)

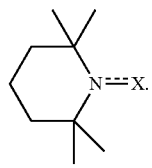

(IIb)

13. The fuel cell system as claimed in claim 10, wherein the antioxidant comprises a compound represented by a general formula (IIIa) or (IIIb) below

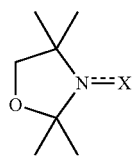

(IIIa)

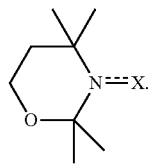

(IIIb)

14. The fuel cell system as claimed in claim 1, wherein the fuel cell comprises one of a hydrogenic type, a direct methanol type, and a direct hydrocarbon type fuel cells.

15. A fuel cell system comprising:
a proton-exchange membrane fuel cell; and
fluid supply means for supplying the fuel cell with a gaseous fluid containing an antioxidant of a gaseous phase,
wherein the fluid contains as a carrier gas of the antioxidant, a fuel or an oxidizer to be supplied to the fuel cell.

16. A fuel cell vehicle comprising a fuel cell system according to claim 1.

17. An operating method for a fuel cell system including a proton-exchange membrane fuel cell, the operating method comprising supplying the fuel cell with a gaseous fluid containing an antioxidant of a gaseous phase,
wherein the fluid contains as a carrier gas of the antioxidant, a fuel or an oxidizer to be supplied to the fuel cell.

* * * * *